United States Patent [19]

Lerch, Jr.

[11] Patent Number: 5,327,798
[45] Date of Patent: Jul. 12, 1994

[54] ADJUSTABLE BICYCLE STEM

[76] Inventor: Paul F. Lerch, Jr., P.O. Box 512, McCall, Id. 83638

[21] Appl. No.: 980,461

[22] Filed: Nov. 23, 1992

[51] Int. Cl.$^5$ ............................................. B62K 21/16
[52] U.S. Cl. ................................. 74/551.3; 74/551.4; 74/551.1; 292/137
[58] Field of Search .................... 74/551.1–551.7, 74/526, 527; 292/137, 163; 280/145, 279

[56] References Cited

U.S. PATENT DOCUMENTS

| 586,307 | 7/1897 | Dickson | 74/551.4 |
|---------|--------|---------|----------|
| 604,187 | 5/1898 | Castle | 74/551.4 |
| 610,469 | 9/1898 | Blashfield | 74/551.4 |
| 645,884 | 3/1900 | Blashfield | 74/551.4 |
| 2,807,488 | 9/1957 | Schlage | 292/163 X |
| 2,813,737 | 11/1957 | Reiter | 292/163 X |
| 3,322,451 | 5/1967 | Bredemus | 292/137 |
| 4,023,436 | 5/1977 | Dodge | 74/551.5 X |
| 4,896,559 | 1/1990 | Marier et al. | 74/551.4 |
| 5,138,900 | 8/1992 | Hals | 74/551.3 |

FOREIGN PATENT DOCUMENTS

| 668588 | 11/1929 | France | 74/551.4 |
|--------|---------|--------|----------|
| 1101558 | 10/1955 | France | 74/551.1 |
| 106312 | 1/1943 | Sweden | 74/551.1 |

*Primary Examiner*—Vinh T. Luong
*Attorney, Agent, or Firm*—William E. Hein

[57] ABSTRACT

An adjustable bicycle stem includes a downwardly projecting member adapted for insertion into a conventional receptacle in the frame of the bicycle and an adjustable forwardly projecting member adapted to hold the bicycle handlebar. The downwardly and forwardly projecting members of the bicycle stem are coupled for rotational adjustment of the forwardly projecting member with respect to the downwardly projecting member by providing a toothed adjustment plate and engaging pin arrangement by which the rider may incrementally raise or lower the handlebar, even while riding.

2 Claims, 1 Drawing Sheet

ADJUSTABLE BICYCLE STEM

BACKGROUND AND SUMMARY OF THE INVENTION

This invention relates generally to bicycles and more particularly to an adjustable stem for use on bicycles. The stem that is employed as a common component of bicycles serves to connect the handlebar to the bicycle frame itself. In prior art bicycles, the stem holds the handlebar in a fixed position with respect to the frame of the bicycle. A fixed position stem and, hence, handlebar, is not at all suitable for all riders under all riding conditions. For example, maintaining the body position required by a fixed position stem may be uncomfortable to the point of painfully straining the rider's back during the course of a long ride. Fixed position stems are also disadvantageous in that they force cyclists to make one choice of stem to fit all riding conditions, such as uphill, downhill, fresh at the beginning of the day, and fatigued at the end of the day. This is much like asking a golfer to select a single club with which to play an entire round of golf.

Some bicycle manufacturers have made an attempt to minimize the problems presented by fixed position stems by offering different fixed position stems on different bicycle models. For example, a very upright stem may be offered on models used by beginners, while a very forward stem may be offered on models targeted for agressive or expert riders. However, even these different fixed position stems offered as a function of the bicycle model purchased are disadvantageous in that they first force a bicycle purchaser to choose between an aggressive bicycle and a strictly recreational bicycle at the time of purchase. After he has purchased such a bicycle, the rider is forced to accept the particular fixed position stem, with which his bicycle is equipped, under all types of riding conditions.

It is therefore the principal object of the present invention to provide an adjustable bicycle stem that permits the rider to adjust the position of the handlebar, while riding, to accommodate a variety of terrain conditions that may be encountered, as well as his physical condition at any time.

This and other incidental objects are accomplished in accordance with the illustrated preferred embodiment of the present invention by providing a bicycle stem having a downwardly projecting member adapted for insertion into a conventional receptacle in the frame of a bicycle and an adjustable forwardly projecting member adapted to hold the bicycle handlebar. The downwardly and forwardly projecting members of the stem are coupled for rotational adjustment of the forwardly projecting member with respect to the downwardly projecting member by providing a toothed adjustment plate and engaging pin arrangement by which the rider may incrementally raise or lower the handlebar, even while riding.

DETAILED DESCRIPTION OF THE PREFERRED EMBODIMENT

Figure 1:
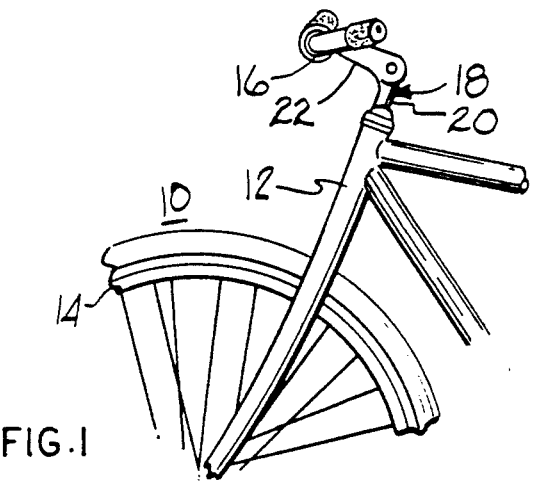
FIG. 1 is a partial pictorial diagram illustrating the front portion of a bicycle equipped with the adjustable bicycle stem of the present invention.

Referring now to FIG. 1, there is shown the front portion of a conventional bicycle 10 having a frame 12, a front wheel 14, a handlebar 16, and a bicycle stem 18 coupling the frame 12 to the handlebar 16 such that the handlebar 16 can be used to provide directional control of bicycle 10 by turning front wheel 14 to the left or to the right.

Figure 2:
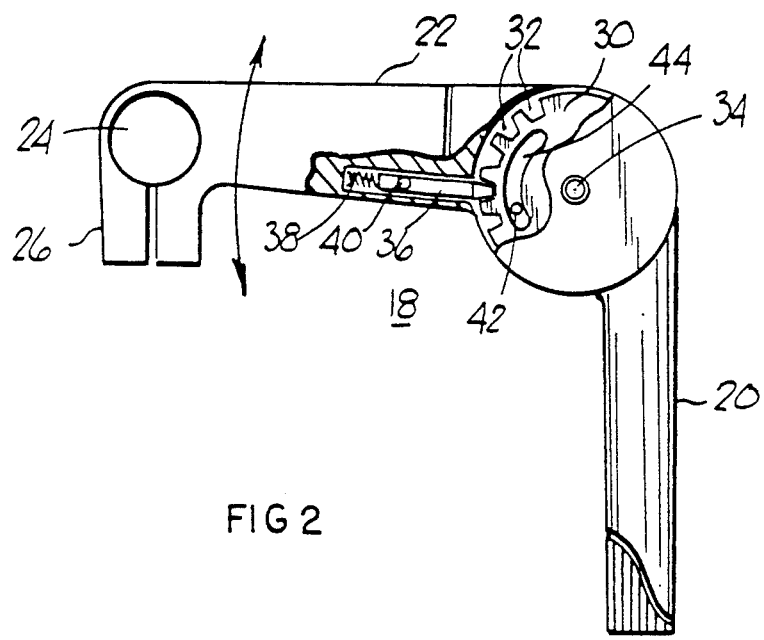
FIG. 2 is an overall pictorial diagram of the adjustable bicycle stem of the present invention, cut away to illustrate the adjustment mechanism employed therein.
Figure 3:
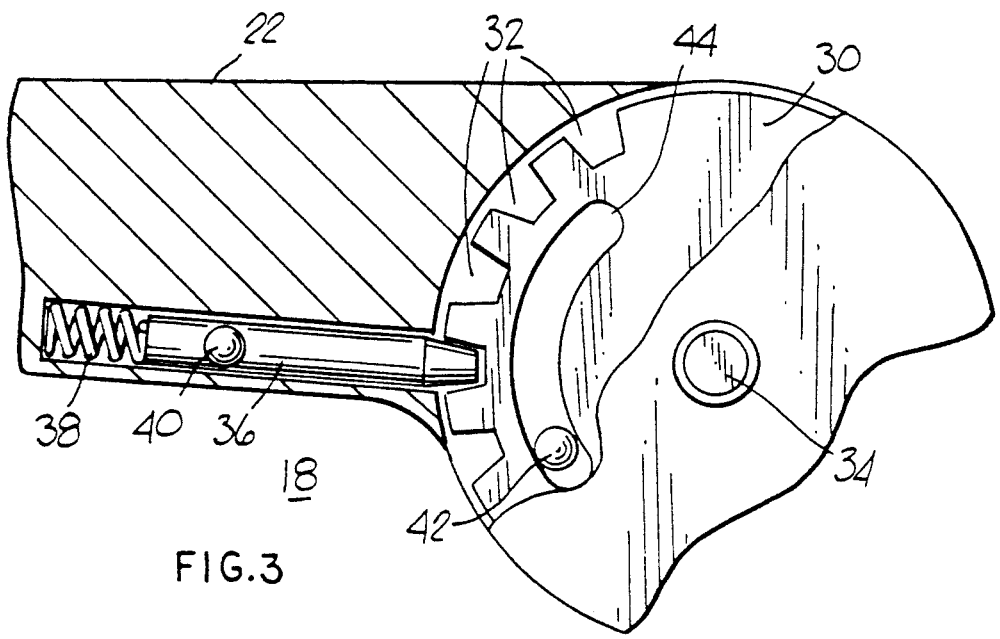
FIG. 3 is a detailed diagram of the adjustment mechanism employed in the adjustable bicycle stem of FIG. 2.

Referring now to FIGS. 2 and 3, there are shown overall and detailed pictorial diagrams of the adjustable bicycle stem 18 of the present invention as it is employed as a component of bicycle 10 of FIG. 1. Stem 18 includes a downwardly projecting fixed member 20 that is adapted for being conventionally inserted into a receptacle in bicycle frame 12. A forwardly projecting member 22 includes a conventional aperture 24 and clamp 26 for retaining handlebar 16. At its upper end, downwardly projecting member 20 is enlarged to form an adjustment plate 30 that includes a plurality of spaced teeth 32 along a forward periphery thereof. At its rearward end, forwardly projecting member 22 is hingedly attached by means of a center pin 34 to adjustment plate 30 of downwardly projecting member 20. Forwardly projecting member 22 includes a pin 36 that slides within a cavity of forwardly projecting member 22. A forward end of pin 36 engages a spring 38 and a rearward end of pin 36 is adapted to engage a selected one of the teeth 32 in the adjustment plate 30. An adjustment knob 40, protruding outwardly from pin 36 is provided to permit the rider to move pin 36 forward against spring 38 to thereby release the engagement of pin 36 with one of the teeth 32 of adjustment plate 30. The rider may then move forwardly projecting member 22 either upward or downward, as desired to a new position that is maintained by releasing adjustment knob 40, thereby allowing spring 38 to urge pin 36 rearward so that it engages one of the teeth 32 in adjustment plate 30 that corresponds to the new position of forwardly projecting member 22. Adjustment knob 40 may be conveniently actuated by the rider while riding the bicycle 10 to adjust forwardly projecting member 22 either upward or downward to correspondingly adjust the position of handlebar 16, as desired. A fixed safety stop 42, protruding perpendicularly from forwardly projecting member 22, moves within a mating arcuate slot 44 in adjustment plate 30 to limit the range of hinged motion of forwardly projecting member 22 with respect to downwardly projecting member 20.

What is claimed is:

1. An adjustable bicycle stem comprising:
    a downwardly projecting member (20) adapted for insertion into a conventional stem receptacle in a frame of a bicycle, said downwardly projecting member (20) being formed to include an adjustment plate (30) at an upper end thereof;
    a forwardly projecting member (22) adapted to hold a bicycle handlebar (16) at a forward end thereof, the downwardly and forwardly projecting members (20, 22) being coupled for incremental rotational adjustment of the forwardly projecting member (22) with respect to the downwardly projecting member (20) to thereby enable a rider to incrementally raise or lower the bicycle handlebar (16); and safety stop means for limiting rotational adjustment of the forwardly projecting member (22) with respect to the downwardly projecting member (20), said safety stop means comprising an arcuate slot (44) in said adjustment plate (30) and a pin (42) fixedly positioned on said forwardly projecting member (22) for movement within said arcuate slot (40).

2. An adjustable bicycle stem comprising:

a downwardly projecting member (20) adapted for insertion into a conventional stem receptacle in a frame of a bicycle, said downwardly projecting member (20) being formed to include an adjustment plate (30) at an upper end thereof, said adjustment plate (30) including a plurality of spaced teeth (32) along a forward periphery thereof;

a forwardly projecting member (22) adapted to hold a bicycle handlebar (16) at a forward end thereof, the downwardly and forwardly projecting members (20, 22) being coupled for incremental rotational adjustment of the forwardly projecting member (22) with respect to the downwardly projecting member (20) to thereby permit the rider to incrementally raise or lower the bicycle handlebar (16), said forwardly projecting member (22) being formed to include a cavity housing a longitudinal spring-loaded adjustment pin (36) for engaging a selected one of the teeth (32) of said adjustment pin (30), said adjustment pin (36) including adjustment knob means (40) actuable by a rider for enabling the rider to disengage said adjustment pin (36) from a tooth (32) of said adjustment plate (30) with which it was previously engaged, for enabling the rider to then raise or lower the bicycle handlebar (16) to a desired position, and for enabling the rider to then engage said adjustment pin (36) with a tooth (32) of said adjustment plate (30) corresponding to said desired position by releasing said knob means (40); and safety stop means for limiting rotational adjustment of the forwardly projecting member (22) with respect to the downwardly projecting member (20), said safety stop means comprising an arcuate slot (44) in said adjustment plate (30) and a pin (42) fixedly positioned on said forwardly projecting member (22) for movement within said arcuate slot (44).

* * * * *